United States Patent [19]

Pletcher

[11] 4,318,549
[45] Mar. 9, 1982

[54] TANK FOR CONTAINING LARGE VOLUMES OF FLUIDS

[76] Inventor: Raymond E. Pletcher, 705 NW. 5th, Wilson, Okla. 73463

[21] Appl. No.: 183,056

[22] Filed: Sep. 2, 1980

[51] Int. Cl.³ .................. B60P 3/22; B62D 21/02; B65D 88/12; B65D 90/02
[52] U.S. Cl. .................. 280/5 C; 220/1.5; 220/71; 296/204
[58] Field of Search .......... 220/5 A, 71, 1.5; 280/5 C, 5 D, 5 E; 296/15, 182, 183, 187, 193, 203, 204; D12/97

[56] References Cited

U.S. PATENT DOCUMENTS

| | | | |
|---|---|---|---|
| D. 86,698 | 4/1932 | Carter | D12/97 |
| 2,533,041 | 12/1950 | Plummer | 220/71 |
| 2,558,168 | 6/1951 | Bernstein | 280/5 C |
| 3,124,265 | 3/1964 | Bertels | 220/1.5 |
| 3,374,029 | 3/1968 | Barker | 296/187 |

FOREIGN PATENT DOCUMENTS 722093 11/1965 Canada .................. 296/204

*Primary Examiner*—Allan N. Shoap

*Attorney, Agent, or Firm*—William R. Laney

[57] ABSTRACT

A transportable elongated tank for containing fluids which includes a pair of opposed side walls, a front wall, a back wall and a floor assembly. The floor assembly includes a plurality of longitudinal spaced beams which are interconnected by a plurality of longitudinally spaced, substantially parallel, transversely extending, trapezoidally shaped channel plates. Multiple arrays of the channel plates are provided, with each array including a pair of end-lapped, reversely turned channel plates disposed centrally with respect to the longitudinal centerline of the tank, and such pair of channel plates having relatively smaller end portions overlapped and secured to each other. The several channel plates each have a first edge flange located in a common plane containing all such first edge flanges, and a second edge flange. The second edge flanges of the several channel plates are located in, and define, two planes extending at an angle to each other and converging at the centerline of the tank. Internal floor plates are supported upon, and secured to, the second flanges to form a V-shaped floor and supporting surface for fluid contained in the tank.

3 Claims, 8 Drawing Figures

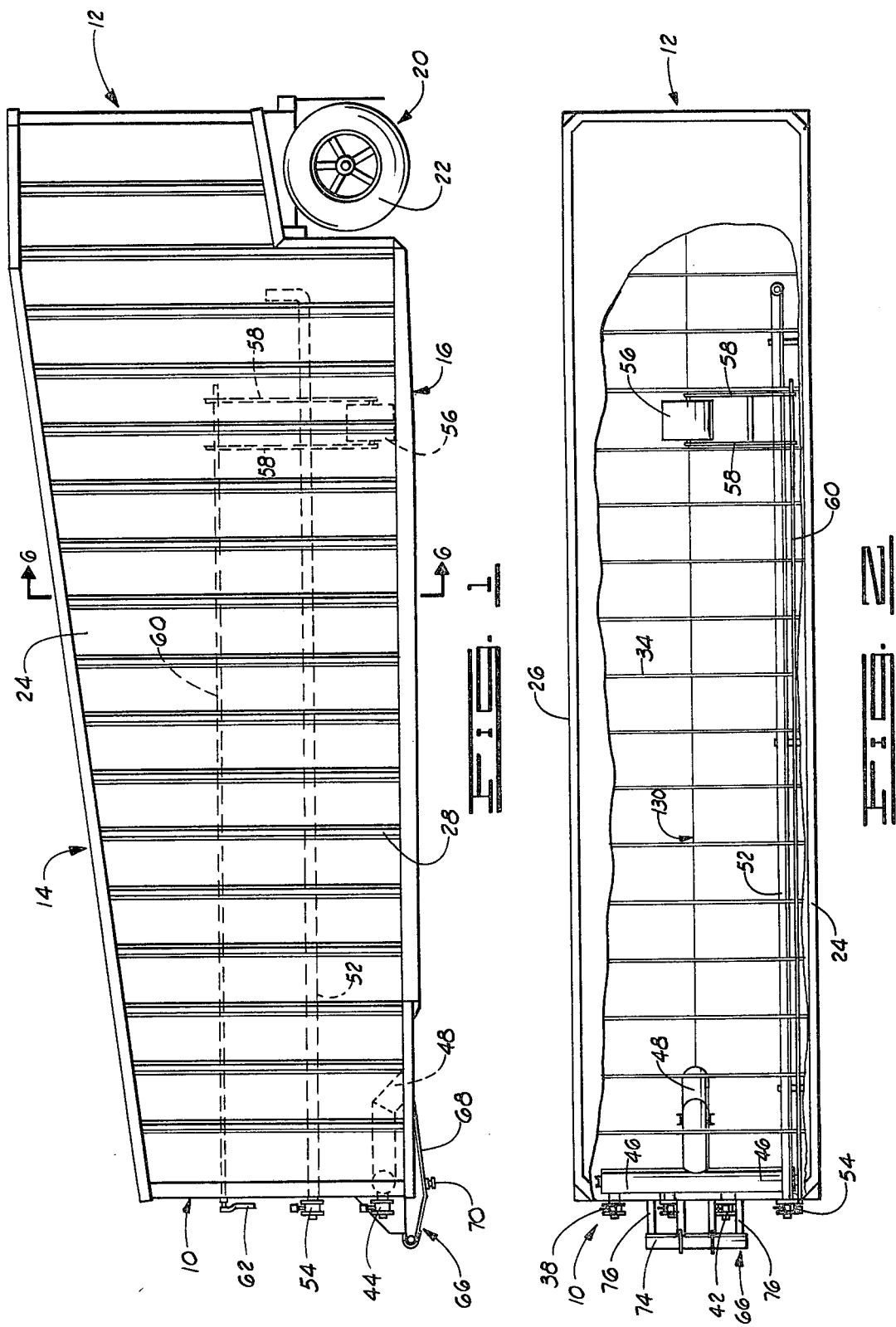

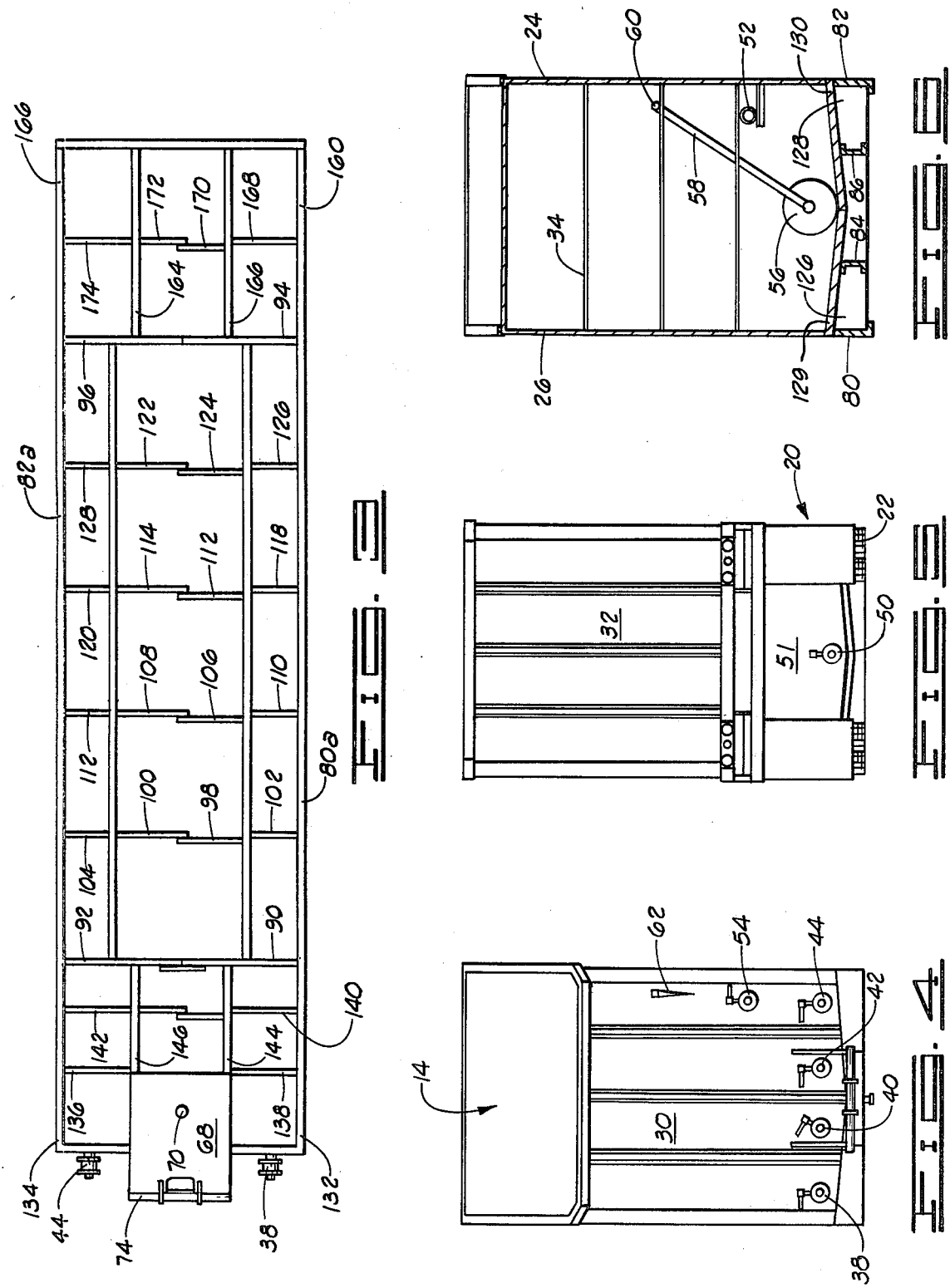

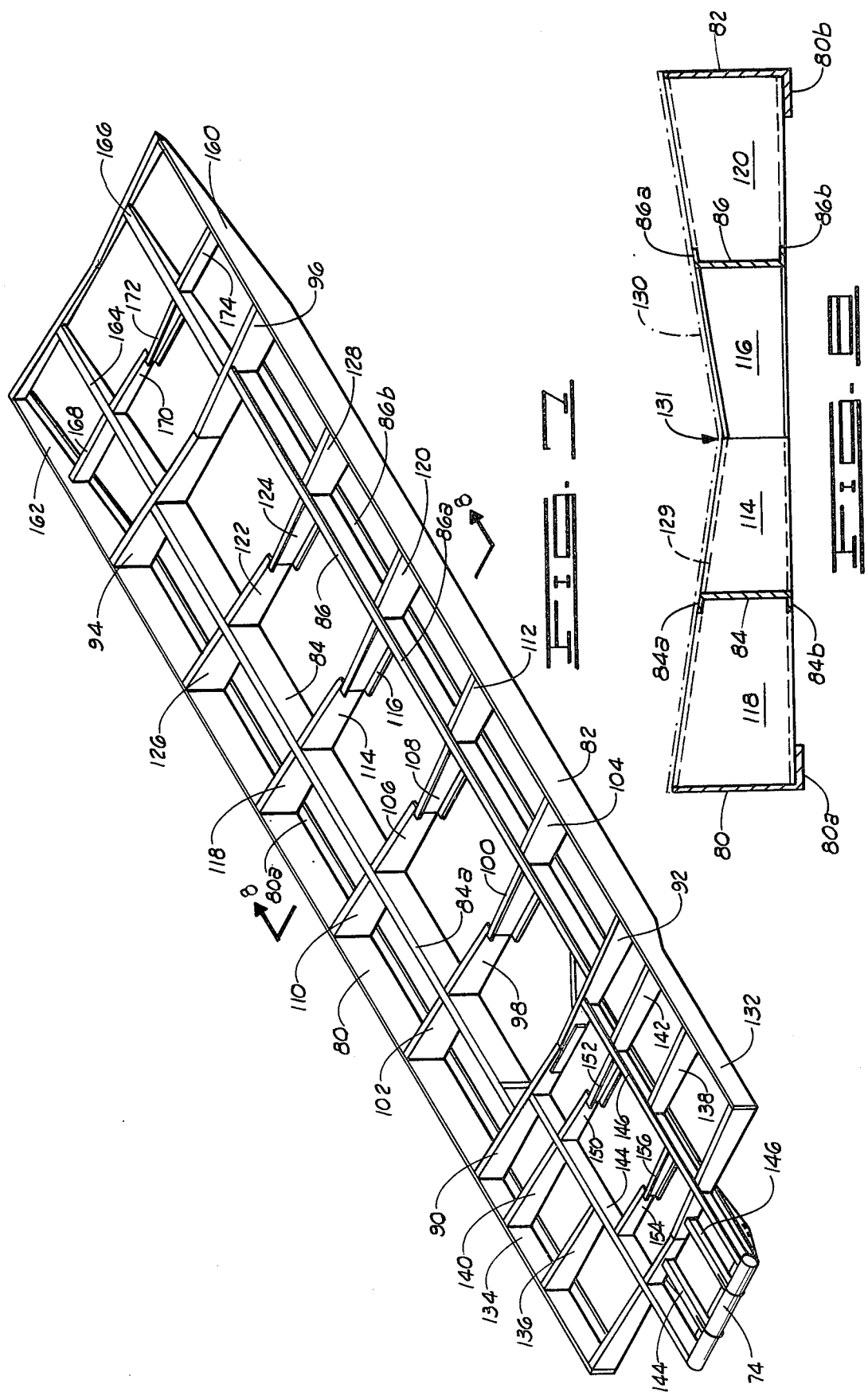

4,318,549

TANK FOR CONTAINING LARGE VOLUMES OF FLUIDS

BACKGROUND OF THE INVENTION

1. Field of the Invention

This invention relates to tanks for containing large volumes of fluids, and more particularly, to tanks adapted to contain fracturing fluids of high density, and frequently of a corrosive character.

2. Brief Description of the Prior Art

In my U.S. Pat. No. Des. 253,051, I illustrate a tank adapted for the containment of fluids used in fracturing subterranean formations to stimulate the production of oil and gas therefrom. Such tanks are generally rested upon the ground at a drilling or oil production site, and serve as a reservoir for containing acid or various chemical compositions used for fracturing or increasing the permeability of a hydrocarbon-containing formation. They are then cleaned and transported to a new fracturing site. To facilitate transport, such tanks have a step at one end to accommodate a dual-wheeled truck or dolly, and provided with a fifth wheel-engaging structure at the opposite end. In order to provide maximum fluid capacity without sacrifice of transport capability, such tanks are often of trapezoidal configuration as shown in may above-cited design patent.

The fluids which are used in well treating and in formation fracturing and which are often placed in such tanks are frequently corrosive to metal, and are sometimes quite dense. When the latter characteristic is experienced, the fluid tanks used to contain such fluid must be structurally strong to avoid bulging or mechanical failure. The tank illustrated in my U.S. Pat. No. Des. 253,051 is well adapted for the containment of dense and corrosive liquids. It includes a V-shaped bottom having a trough extending longitudinally of the bottom along the center line thereof which facilitates the emptying of the tank, and the washing down and cleaning of the tank after its usage at a job site is completed.

BRIEF DESCRIPTION OF THE PRESENT INVENTION

The present invention provides an improved V-bottom tank for containing dense and corrosive fracturing fluids. Broadly described, the tank includes a pair of opposed, ribbed side walls interconnected by a forward wall and a rear wall at opposite ends of the tank. The bottom of the tank includes a plurality of substantially parallel, spaced longitudinal beams, and a plurality of spaced, transversely extending, trapezoidally shaped channel plates interconnecting the longitudinal beams. The beams and channel plates provide support for internal bottom plates. The internal bottom plates are arranged to slope downwardly and inwardly from opposite sides of the tank to a central longitudinally extending trough. This configuration is achieved by arranging all of the edge flanges at a common side of all the trapezoidally shaped channel plates in a common plane for supporting the tank on the ground, and arranging the flanges at the other side of the channel plates to lie in two planes angled to each other, and intersecting at the locus of the trough. At the location of the trough along the longitudinal center line of the tank, the channel plates are overlapped, and provide high strength support for the bottom plates at this location.

A step is provided in the body of the tank adjacent the rear wall to facilitate mounting a wheeled truck or dolly under the tank during transport. A fifth wheel engaging assembly is located at the opposite end of the tank.

An important object of the invention is to provide a fracturing fluid tank of large capacity, and characterized in having an extended useful life by reason of the enhanced susceptibility to thorough cleaning, and also in having adequate structural strength to safely contain high density fluids.

A further object of the invention is to provide an improved transportable tank for containing fracturing fluids, which tank has a specially structured bottom facilitating the storage therein of dense and highly corrosive fluids.

These and other objects will be apparent from the following detailed description of a preferred embodiment of the invention when the same is considered in conjunction with the accompanying drawings which illustrate the invention.

GENERAL DESCRIPTION OF THE DRAWINGS

FIG. 1 is a side elevation view of a tank constructed in accordance with the present invention, and showing a wheeled truck or dolly connected to the rear side of the truck at a step provided in the tank for the accommodation of such wheeled truck or dolly.

FIG. 2 is a plan view of the tank shown in FIG. 1, with a portion of the top of the tank broken away to show the interior thereof.

FIG. 3 is a bottom plan view of the tank shown in FIG. 1.

FIG. 4 is a front elevation view of the tank illustrated in FIG. 1.

FIG. 5 is a rear elevation view of the tank shown in FIG. 1.

FIG. 6 is a sectional view taken along line 6—6 of FIG. 1.

FIG. 7 is a detail view showing the construction of the longitudinal beams and transverse trapezoidal channel plates used in the construction of the bottom of the tank of the invention.

FIG. 8 is a sectional view taken along line 8—8 of FIG. 7.

DETAILED DESCRIPTION OF A PREFERRED EMBODIMENT OF THE INVENTION

Referring initially to FIG. 1 of the drawings, the tank of the invention includes a front end 10, a rear end 12, a top 14 and bottom 16. In longitudinal section, the tank is generally trapezoidally configured, and has a relief step or recessed zone 18 adjacent the lower rear end for the accommodation of a detachable truck or dolly, designated generally by reference numeral 20 and including wheels 22. In transverse cross-section, the tank is rectangular in configuration.

At its opposite sides, the tank includes a pair of ribbed side walls 24 and 26 of trapezoidal side elevational configuration. Each of the side walls 24 and 26 includes a plurality of parallel, vertically extending reinforcing ribs 28 which extend from the bottom 16 to top 14 of the tank. The parallel side walls 24 and 26 are interconnected by a front wall 30 and a rear or back wall 32. The opposed side walls 24 and 26 are interconnected by a plurality of parallel, transversely extending reinforcing rods 34 which are welded to the inner sides of the opposite side walls, and in this respect, provide an advantage over a construction in which the reinforcing rods are extended through the side walls to the outside thereof for securement at the latter location. This type of construction weakens the side walls, in contrast to the present invention where the reinforcing rods are welded to the inner side of the opposed side walls.

Provided on the outer side of the front wall 30 are a plurality of fluid discharge nozzles 38, 40, 42 and 44, as shown in FIG. 4. The fluid discharge nozzles 38–44 are connected through nipples to a transversely extending fluid manifold 46 disposed interiorly of the front wall 30. The manifold 46 is connected to a central fluid suction pipe or duct 48 which, as illustrated in FIGS. 1 and 2, extends downwardly into close proximity to a trough located in the center of the bottom of the tank, and hereinafter explained in greater detail.

At the rear side of the relief step or recessed zone and adjacent the bottom 16 of the tank, a clean-out discharge fitting 50 is provided and opens through a vertically extending step plate 51. The discharge fitting 50 is provided on the longitudinal centerline of the tank and adjacent the lowest point on the floor of the tank for purposes of efficiently discharging a cleaning solution or fluid from the tank in a manner and for a purpose hereinafter described.

A fluid charging or filling line 52 extends longitudinally of the tank along one side wall thereof and is connected to a charging valve and fitting 54 disposed on the outer side of the front wall 30 of the tank in the manner illustrated in FIGS. 1, 2 and 4 of the drawings. In order to provide an indication to an operator outside the tank of the level of fluid in the tank, a large float element 56 is disposed in the rear portion of the tank where the tank has its greatest depth from top to bottom and this float element is supported on a pair of support rods 58 which are connected to one end of a pivotally supported, longitudinally extending control rod 60. The control rod 60 extends through the front wall 30 of the tank and is connected to a swinging pointer or indicator element 62. This indicator element 62 can be located in association with a suitable scale or gauge (not shown) mounted on the outer side of the front wall 30 to provide an indication of the level of fluid within the tank as sensed by the float 56 within the tank as the fluid level changes.

In order to facilitate the transport of the tank from one service location to another, a fifth wheel engaging subassembly, designated generally by reference numeral 66, is secured to the lower front side of the tank and includes a fifth wheel contact plate 68 and a fifth wheel engaging connection pin 70. Additionally, a large bumper element-skid 74 is secured to the fifth wheel contact plate 68 and to certain hereinafter described longitudinal beams as shown in FIGS. 1 and 2.

An important feature of the present invention is the floor assembly which is employed to provide a high-strength floor or bottom in the tank which is capable of supporting large volumes of high density fracturing fluids and the like. The floor assembly also facilitates complete drainage of fluid from the tank, and ease of cleaning the tank following usage. The floor assembly employed is best illustrated in FIGS. 3, 6, 7 and 8 of the drawings.

As shown in FIG. 7, the floor assembly includes a pair of opposed, outer, longitudinally extending, substantially parallel angle beams 80 and 82. In addition to a vertically extending main plate, each of these beams has integrally formed along the lower edge thereof, a horizontal, inwardly extending flange, with these flanges being denominated 80a and 80b, respectively. Located between the outer longitudinally extending beams 80 and 82 are a pair of parallel, spaced, longitudinally extending internal channel beams 84 and 86. As shown in FIG. 8, the channel beams 84 and 86 are of lesser width than the outer beams 80 and 82. Each of the channel beams 84 and 86 includes a pair of edge flanges 84a, 84b and 86a, 86b, respectively, as shown in FIG. 8.

Within the central portion of the floor assembly, a plurality of spaced, transversely extending, trapezoidally shaped channel plates are provided and interconnect the several longitudinal beams 80, 82, 84 and 86. Thus, a pair of trapezoidally shaped channel plates 90 and 92 extend inwardly from the outer longitudinal beams 80 and 82 toward each other, and meet at the centerline of the tank after extending across and being welded or otherwise secured to opposed ends of the internal longitudinal channel beams 84 and 86. The plates 90 and 92 are arranged with the smaller ends of the trapezoidal figure constituted by each of the plates in abutting contact so that the upper edges of each of the plates incline downwardly to the point of abutment of the plates at the centerline of the tank. At the opposite end of the central portion of the floor assembly, a second pair of trapezoidally shaped, transversely extending channel plates are extended inwardly from the side beams 80 and 82 and are designated by reference numerals 94 and 96. These plates, like the plates 90 and 92 at the opposite end of the central portion of the floor assembly, abut at the longitudinal centerline of the tank, and are arranged to provide exposed upper surfaces located in convergent planes angled with respect to each other and intersecting at the centerline of the tank.

Between the channel plate pairs 90-92 and 94-96, a series of transversely extending, trapezoidally shaped channel plates are provided in the floor assembly and further interconnect the outer beams 80 and 82 and the internal channel beams 84 and 86. These trapezoidal, transversely extending plates are generally arrayed, in the illustrated embodiment, in sets which include four of the trapezoidally shaped plates in each set. Thus, as shown in FIG. 7, the set of transversely extending, trapezoidally shaped channel plates adjacent the channel plates 90 and 92 includes a lapped pair of centrally disposed, oppositely turned plates 98 and 100 which have their small ends lapped over each other and the flanges along the opposite edges thereof reversed. This set of trapezoidally shaped plates also includes a pair of outer plates 102 and 104 which are transversely aligned with the two inner plates 98 and 100. In similar fashion, other arrays or sets of the trapezoidal plates include the set which includes the internal lapped plates 106 and 108, along with the outer channel plates 110 and 112; the set which includes the internal lapped plates 114 and 116, along with the transversely aligned, outer channel plates 118 and 120; and the set which includes the inner lapped plates 122 and 124, along with the transversely aligned outer channel plates 126 and 128.

It will be noted in referring to FIGS. 7 and 8 that the trapezoidally shaped, transversely extending channel plates are arranged and located so that the edge flanges at one of the side edges of all of the several trapezoidally shaped, transversely extending channel plates are aligned in a common plane beneath the bottom of the floor assembly. Therefore the tank can rest flatly on the ground when it is in use. At the opposite edges of the several trapezoidally shaped channel plates, the edge flanges are disposed so that, collectively, these edge flanges define two convergent planes which extend at an angle to each other, and intersect at the longitudinal centerline of the tank to provide a generally V-shaped configuration. Large sheet-type floor plates 129 and 130 are secured to the upper flanges on the upper edges of the several trapezoidally shaped, transversely extending channel members to form the fluid supporting floor of the floor assembly, and such floor plates lie in the described planes so as to extend at an angle to each other and converge at the centerline of the bottom of the tank. The floor plates 129 and 130 thus form a trough which extends longitudinally of the tank along its centerline as indicated generally by the reference numeral 131 in FIG. 8.

At the forward end of the floor assembly, and forward of the central portion thereof which has been described, a slight upward sweep is provided in the floor assembly, and is defined in part by the forward extension of the outer longitudinal beam 82, with such forward extension being denominated by reference numeral 132. A similar forward extension is provided on the outer longitudinal beam 80 and is denominated by the reference numeral 134. Between the forward beam extensions 132 and 134 of the outer longitudinal beams 80 and 82, a plurality of downwardly and inwardly converging, transversely extending, trapezoidally shaped floor support channel plates 136–142 are provided and have their outer, larger ends secured to the beam extensions 132 and 134. The inner ends of these trapezoidally shaped, transversely extending channel plates are secured to forwardly extending channel beams 144 and 146 which project through the front wall 30 of the tank and form a part of the fifth wheel subassembly 66. The channel beams 144 and 146 are interconnected by pairs of trapezoidally shaped, transversely extending floor supporting channel plates 150, 152 and 154, 156. These pairs of trapezoidally shaped, floor-supporting channel plates have their adjacent ends lapped and the flange elements reversed, as has been previously described, and, along with the trapezoidally shaped plates 136–142, are positioned so that their respective flanges are aligned with the flanges of the several trapezoidally shaped channel plates used in the central portion of the floor assembly as hereinbefore described. Thus, the sheet-type floor plates 129 and 130 placed atop the various trapezoidally shaped plates used in the central portion also extend across and are supported by the trapezoidally shaped, transversely extending plates which are located between the forward beam extensions 132 and 134 at the forward end of the tank.

At the rear end portion of the tank and to the rear of the floor assembly central portion hereinbefore described, the longitudinally extending outer beams 80 and 82 also have rearward beam extensions 160 and 162. A pair of longitudinally extending rear channel beams 164 and 166 are placed between the rear extensions 160 and 162 of the outer, longitudinally extending beams 80 and 82 and are interconnected with each other and with the extensions 160 and 162 by a plurality of trapezoidal plates 168–174 in the manner hereinbefore described.

The described floor assembly has great structural strength, and by reason of the V-shaped floor plate configuration, provides a trough extending along the longitudinal centerline of the tank. This allows the last small quantity of fracturing fluid to be sucked out of the tank via the suction pipe as the contents thereof are used at a job site. Moreover, this construction greatly facilitates the cleaning of the tank, since the cleaning liquid, rather than standing at spots along the bottom of the tank, as would be the case with a flat bottom tank, runs to the central trough, and then toward the rear of the tank from which it can be easily discharged through the fitting 50.

Although certain preferred embodiments have been herein described in order to explain the basic principles of the invention adequately to enable its clear perception by those skilled in the art, it will be understood that various changes and innovations in the illustrated and described embodiment of the invention can be effected without departure from these basic principles. Changes and innovations of this type are therefore deemed to be circumscribed by the spirit and scope of the invention except as the same may be necessarily limited by the appended claims, or reasonable equivalents thereof.

What is claimed is:

1. A transportable tank for containing large volumes of dense and corrosive liquids, comprising:
   a pair of opposed, substantially parallel, ribbed side walls of generally trapezoidal configuration and each having a relief at one corner thereof for the accommodation of detachable wheel means used in the transport of the tank;
   a top wall extending between and interconnecting the side walls;
   a front wall and a rear wall each extending between and interconnecting the side walls; and
   a floor assembly including:
   a plurality of substantially parallel, spaced longitudinal beams;
   a plurality of longitudinally spaced, substantially parallel, transversely extending, trapezoidally shaped channel plates, said channel plates extending between and interconnecting said longitudinal beams and including multiple arrays of substantially transversely aligned channel plates, each of said arrays including a pair of end-lapped, reversely turned, centrally disposed channel plates having relatively smaller end portions overlapped and secured to each other adjacent the longitudinal centerline of the tank, each of said channel plates having edge flanges disposed along the opposite side edges thereof, and further positioned to locate all of the edge flanges at one side edge of each of the channel plates in a common plane for flatly supporting the tank in an operational position resting upon the ground, and to locate the second edge flanges at opposite edges of each of the channel flanges in two planes extending at an angle to each other and converging at the longitudinal centerline of the tank; and
   internal floor plates supported upon, and secured to, said second edge flanges to form a V-shaped supporting surface upon the interior of the tank.

2. A transportable tank as defined in claim 1 wherein said floor assembly is more specifically characterized in having a central portion which includes:
   a pair of said longitudinal beams extending parallel to each other and disposed at each of the opposite outer sides of said central portion;
   at least two parallel longitudinal beams extending parallel to said first mentioned pair of longitudinal beams, and located between said beams in said first pair of beams;
   a first plurality of said transversely extending, longitudinally spaced, trapezoidally shaped channel plates each extending from one of said beams in said first mentioned pair transversely to the nearest adajcent one of said beams located between said first mentioned pair of beams, and each included in one of said arrays in addition to one of said pairs of end-lapped centrally disposed channel plates; and a second plurality of said transversely extending, longitudinally spaced, trapezoidally shaped channel plates each extending from the other of said beams in said first mentioned pair to the nearest adjacent one of said beams located between said first mentioned pair of beams, and each included in one of said arrays in addition to one of said pairs of end-lapped centrally disposed channel plates.

3. A transportable tank as defined in claim 2 and further characterized as including a plurality of transversely extending reinforcing rods projecting between side walls of the tank and located completely within the tank between said top wall and said floor assembly.

* * * * *